L. DORFMAN.
MAXIMUM DEMAND METER.
APPLICATION FILED APR. 21, 1919.
1,409,365.
Patented Mar. 14, 1922.
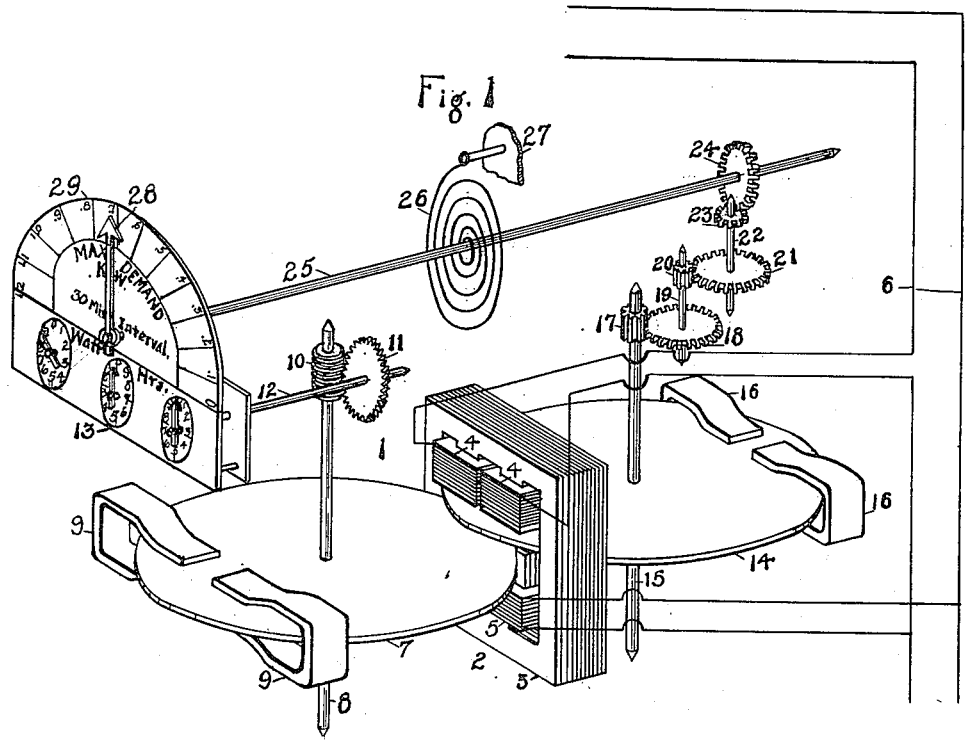
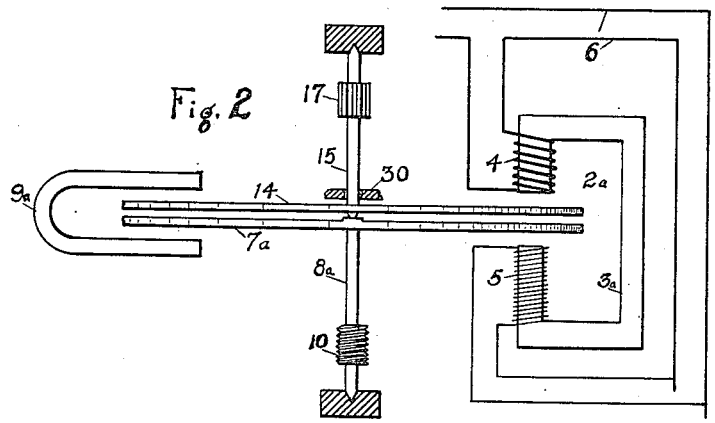
WITNESSES:
Robert P. Thompson.
Elgin B. Robertson.
INVENTOR.
Leo Dorfman.

UNITED STATES PATENT OFFICE.

LEO DORFMAN, OF PITTSBURG, TEXAS.

MAXIMUM-DEMAND METER.

1,409,365. Specification of Letters Patent. Patented Mar. 14, 1922.

Application filed April 21, 1919. Serial No. 291,790.

*To all whom it may concern:*

Be it known that I, LEO DORFMAN, a citizen of the United States, and a resident of Pittsburg, in the county of Camp and State of Texas, have invented a new and useful Improvement in Maximum-Demand Meters, of which the following is a specification.

This case is a continuation in part of my copending application Serial No. 176,932, filed June 25, 1917.

My invention has relation to certain new and useful improvements in electrical measuring instruments, and in such connection it relates more particularly to such instruments for the determining of maximum demand.

The question of a composite rate for electrical service has long since been settled. It is now generally recognized that for a rate to be equitable to all concerned it must be composite. The most satisfactory composite rate is one which consists of an energy charge and a demand charge. In a rough way, this means that each consumer must pay a rate a part of which is proportional to the coal burned in supplying energy to him, and also the remainder of which is proportional to the investment in plant and equipment having capacity enough to take care of his maximum demand on the station.

When public service companies first began to use this type of charge the actual energy consumed during the charge period (usually a month) was easily determined, or integrated, by a watthour meter. The problem of arriving at the maximum demand however, was more complex. In fact, in the beginning this charge was based almost solely on a guess, which was arrived at from the actual capacity of the apparatus which the consumer possessed. This, however, was clearly unfair because in many cases possible only a small part of a consumer's equipment would be used during the charge period. This means of determining the maximum demand naturally tended to discourage the purchase of high capacity equipment. To overcome this difficulty it was clearly necessary that the maximum demand of the consumer be accurately measured during each pay period. Naturally, a great many devices have been constructed to determine the maximum demand of power-consumers. The first devices virtually determined the instantaneous maximum demand during the charge period. These instruments were in effect merely wattmeters, whose pointers were caused to remain at the point of maximum inflection until returned.

Analysis of the problem of maximum demand has shown that other factors than just simply the greatest instantaneous demand should govern the demand charge. This has been found due to the characteristics of the electrical apparatus in general. For example, if a large induction motor is started its demand for a few brief seconds is very high in comparison with its normal full load demand on the station. Careful investigation, however, has shown that it really requires no greater capacity of equipment at the power station to start this motor, than to keep it running under full load. Hence, it would be unfair to the consumer to have his demand charge on this excessive demand of such short duration. Fortunately the ability of the station equipment to carry loads is only limited by the rise in temperature which it can safely stand. This rise in temperature is not instantaneous. In fact, a considerable length of time is required for it to rise even when a constant load is applied. Furthermore, this rise in temperature is not a direct function of the time, but is practically a function of the logarithm of the time. (Logarithm is used to designate the exponential function.) Thus we say that the heating curve in most electrical equipment is characteristically logarithmic with respect to the duration of time. Hence, electrical equipment is capable of taking care of overloads within certain time limits, and this ability varies substantially as the logarithm of the length of duration of the load.

Because of the above fundamental reasons, it has been found that for an instrument to indicate the maximum demand fairly its indication must progress from zero slowly and arrive at the true indication only after a definite time interval. Also the indicating means must indicate values from instant to instant during this time interval which are substantially proportional to the logarithm of the duration of time from the instant at which the load was first thrown on.

In view of the above, I provide a watthour meter, and cause the watthour meter electromagnet to actuate a second disc armature. The rate of motion of this disc armature is controlled by a damping magnet. The disc armature drives a spring restrained pointer, over a suitably arranged dial, through reduction gearing. The action of the damping magnet on the disc determines the shape of the characteristic curve of response, i. e., substantially a logarithmic curve. The gear train and full load speed of the disc armature (when unrestrained) determine the time interval of response of the meter for a given scale and relative strength of spring. Hence, to change the time interval of any meter which has been calibrated it is only necessary to change the gear ratio between the disc armature and the pointer accordingly and change the strength of spring in an inverse proportion to the change in gear ratio.

The nature and scope of my invention as used in connection with watthour meters will be more fully understood from the following description taken in connection with the accompanying drawings forming part hereof, in which,—

Fig. 1 is a perspective view of the device embodying my invention in conjunction with the watthour meter.

Fig. 2 is an elevation view showing a more compact arrangement of the disc armatures whereby both may be actuated by the same electromagnet and be damped by the same permanent magnet, or magnets.

Referring to the drawings, particularly Fig. 1, the watthour meter 1 consists of an electromagnet 2 made up of a magnetizable core member 3, current coils 4, and a potential coil 5. The coils 4 and 5 are energized from the circuit 6. A disc armature 7 is mounted upon the spindle, or arbor, 8 and is actuated by the electromagnet 2. The permanent magnets 9 serve for the regular damping of the disc armature 7. A worm 10 is mounted on the arbor 8 and engages a worm wheel 11. The worm wheel 11 is mounted on a spindle 12. The spindle 12 drives a regular watthour meter counter, or integrating mechanism, 13.

The demand portion of the meter consists of the following parts and instrumentalities,—

A disc armature 14 is actuated by the electromagnet 2. The disc armature 14 is mounted on the spindle, or arbor, 15 and is damped by the permanent magnets 16. A pinion 17 is mounted on the arbor 15 and meshes with a gear wheel 18. The gear wheel 18 is mounted upon a spindle 19. The pinion 20 is also mounted on the spindle 19, and meshes with the gear wheel 21. The gear wheel 21 is mounted on a spindle 22. A pinion (preferably a beveled pinion) 23 is also mounted on the spindle 22 and meshes with the gear wheel (preferably beveled) 24. The gear wheel 24 is mounted on a spindle 25. A spiral spring 26 has one end attached to the spindle 25 and the other end attached to a suitable support 27. A pointer 28 is loosely attached to the spindle 25 and moves over a suitably arranged dial 29. The pointer 28 is retained at the point of maximum reflection by suitable means (not shown) until returned.

Fig. 2 of the drawings shows a means of more cheaply and compactly arranging and controlling the disc armatures as pointed out in the following description,—

The disc armatures $7^a$ and 14 are actuated by the electromagnet $2^a$ consisting of a magnetizable core member $3^a$ having current coils 4 and a potential coil 5. Coils 4 and 5 derive their energy from the circuit 6. Both disc armatures $7^a$ and 14 are damped by the permanent magnet $9^a$. The disc armature $7^a$ is mounted near the extremity of the arbor, or spindle, $8^a$ which has a bearing at its upper extremity for the arbor 15 to rest in. The worm 10 is mounted on the arbor $8^a$ and is the means for driving the remainder of the integrating, or counting, mechanism. The disc armature 14 is mounted near the extremity of the spindle 15 so that it is very near the disc armature $7^a$. A pinion 17 is mounted on the arbor 15 and its purpose is to drive the gear train of the maximum demand portion of the meter. A ring bearing (shown in cross section) 30, guides the arbor 15 and hence the arbor $8^a$ also.

What I claim is,—

1. A maximum-demand meter, comprising an armature and its electro-magnetic driving means, braking means for exerting a counter-torque on the armature substantially proportional to its speed, and means brought slowly into action by the continued rotation of the armature for exerting a counter-torque on the armature substantially proportional to its displacement, so that the displacement of the armature affords a direct and continuous indication substantially proportional to the load and the logarithm of its duration, substantially as described.

2. A maximum-demand meter, comprising an armature, means for exerting on the armature a driving torque substantially proportional to the instantaneous load, means for exerting on the armature a counter-torque varying substantially as the speed of the armature, and means brought slowly into action by the continued rotation of the armature for gradually exerting on the armature a second counter-torque substantially proportional to its displacement, said two counter-torque exerting means being so proportioned and arranged that when the demand is suddenly increased from zero to approximately the full load for which the meter is designed, the armature will make a large number of revolutions extending over a substantial period of time, its movement being first opposed principally by the first counter-torque means and thereafter increasingly opposed by the second counter-torque means until its movement is checked thereby, so that the position of the armature affords a direct and continuous indication which is substantially proportional to the load and the logarithm of its duration, substantially as described.

3. A maximum-demand meter, comprising a rotatable element, means for exerting on said element a driving torque substantially proportional to the instantaneous load, braking means for exerting a counter-torque on said element substantially proportional to its speed, and a spring having a speed reducing connection with said element so as to be brought slowly into action by the continued rotation of said element and gradually exert thereon a second counter-torque substantially proportional to its displacement, whereby the meter has a slow substantially logarithmic response to the load, substantially as described.

4. A maximum-demand meter, comprising a rotatable element, means for exerting on said element a driving torque substantially proportional to the instantaneous load, braking means for exerting a counter-torque on said element substantially proportional to its speed, and a spring so connected that said element has to be brought slowly into action by the continued rotation of said element and gradually exerts thereon a second counter-torque substantially proportional to its displacement, whereby the meter has a slow substantial logarithmic response to the load, substantially as described.

5. The combination with electric generating apparatus and electric power consuming apparatus, of a maximum-demand meter having an armature and means for exerting thereon a driving torque substantially proportional to the instantaneous load, means for exerting on the armature a counter-torque substantially proportional to the speed of the armature, and means brought slowly into action by the continued rotation of the armature and exerting a second counter-torque on the armature substantially proportional to its displacement, said several means being so proportioned and arranged that the armature has a slow, substantially logarithmic response approximately proportional to the temperature change occasioned in the generator apparatus by the load being metered, substantially as described.

In testimony whereof, I have hereunto subscribed my name this nineteenth day of April, 1919.

LEO DORFMAN.